(12) United States Patent  
Schindler

(10) Patent No.: US 8,923,864 B2  
(45) Date of Patent: Dec. 30, 2014

(54) HANDOVER PROACTIVE ASSOCIATION PROVISIONING SUPPORT METHOD AND SYSTEM

(75) Inventor: Sigram Schindler, Berlin (DE)

(73) Assignee: Sigram Schindler Beteiligungsgesellschaft mbH, Berlin (DE)

( * ) Notice: Subject to any disclaimer, the term of this patent is extended or adjusted under 35 U.S.C. 154(b) by 1 day.

(21) Appl. No.: 13/481,014

(22) Filed: May 25, 2012

(65) Prior Publication Data

US 2012/0302242 A1 Nov. 29, 2012

Related U.S. Application Data

(60) Provisional application No. 61/490,469, filed on May 26, 2011.

(51) Int. Cl.
*H04W 36/00* (2009.01)
*G06Q 30/02* (2012.01)
*G06Q 30/08* (2012.01)
*H04W 36/14* (2009.01)

(52) U.S. Cl.
CPC ............ *H04W 36/14* (2013.01); *G06Q 30/02* (2013.01); *G06Q 30/08* (2013.01); *H04W 36/0011* (2013.01)
USPC .......................................... 455/436; 370/331

(58) Field of Classification Search
USPC ........... 455/436–439; 370/331–332, 442–444
See application file for complete search history.

(56) References Cited

U.S. PATENT DOCUMENTS 6,690,936 B1 * 2/2004 Lundh ..................... 455/436
7,266,101 B2 * 9/2007 Dorenbosch ............. 370/331
(Continued)

FOREIGN PATENT DOCUMENTS

| EP | 1458148 A1 | 9/2004 |
| EP | 1560445 A2 | 8/2005 |
| EP | 2 027 747 B1 | 6/2011 |
| WO | 2005/120183 A2 | 12/2005 |

OTHER PUBLICATIONS

Written Opinion of the International Searching Authority—PCT/EP2012/073721.

*Primary Examiner* — Cong Tran
(74) *Attorney, Agent, or Firm* — Vorys, Sater, Seymour and Pease LLP; Vincent M. DeLuca

(57) ABSTRACT

A method and system is provided that supports minimizing handover times of netsurfing smartphones controlled by home Internet Access Devices (IADs) to shared IADs and optimizing earnings from these shared devices. The shared services are provisionable right at the handovers. Any shared IAD can implement an automatic auction of its service capacity controlled by a clearing system. The shared IADx automatically generates lucrative clicks on services of location based Internet-apps issued by Ayz passing through shared IADx's reach. Several such provisioning systems may run concurrently, thus enabling high flexibility as to instant and local/regional system restructuring, e.g. on behalf of pricing strategy adaptations and/or version control. The application of the invention needs no change of the networks between which the above described pre-HO support of their HOs/MHOs shall be performed, i.e. it may work on top of all networks between which HOs or MHOs may be executed.

10 Claims, 6 Drawing Sheets

(56) References Cited

U.S. PATENT DOCUMENTS

| | | | |
|---|---|---|---|
| 8,014,364 B2 | 9/2011 | Schindler et al. | |
| 8,509,776 B2 * | 8/2013 | Adatrao et al. | 455/436 |
| 2002/0176403 A1 * | 11/2002 | Radian | 370/352 |
| 2003/0231616 A1 * | 12/2003 | Rashti | 370/352 |
| 2004/0137902 A1 * | 7/2004 | Chaskar et al. | 455/436 |
| 2005/0060198 A1 * | 3/2005 | Bayne | 705/2 |
| 2005/0288023 A1 | 12/2005 | Kim et al. | |
| 2009/0209314 A1 * | 8/2009 | Rybak | 463/20 |
| 2009/0274115 A1 | 11/2009 | Schindler et al. | |
| 2010/0008328 A1 * | 1/2010 | Maheshwari et al. | 370/331 |
| 2010/0085942 A1 | 4/2010 | Oota et al. | |
| 2010/0173633 A1 * | 7/2010 | Catovic et al. | 455/436 |
| 2011/0286431 A1 | 11/2011 | Schindler et al. | |
| 2014/0141781 A1 * | 5/2014 | Park et al. | 455/436 |

\* cited by examiner

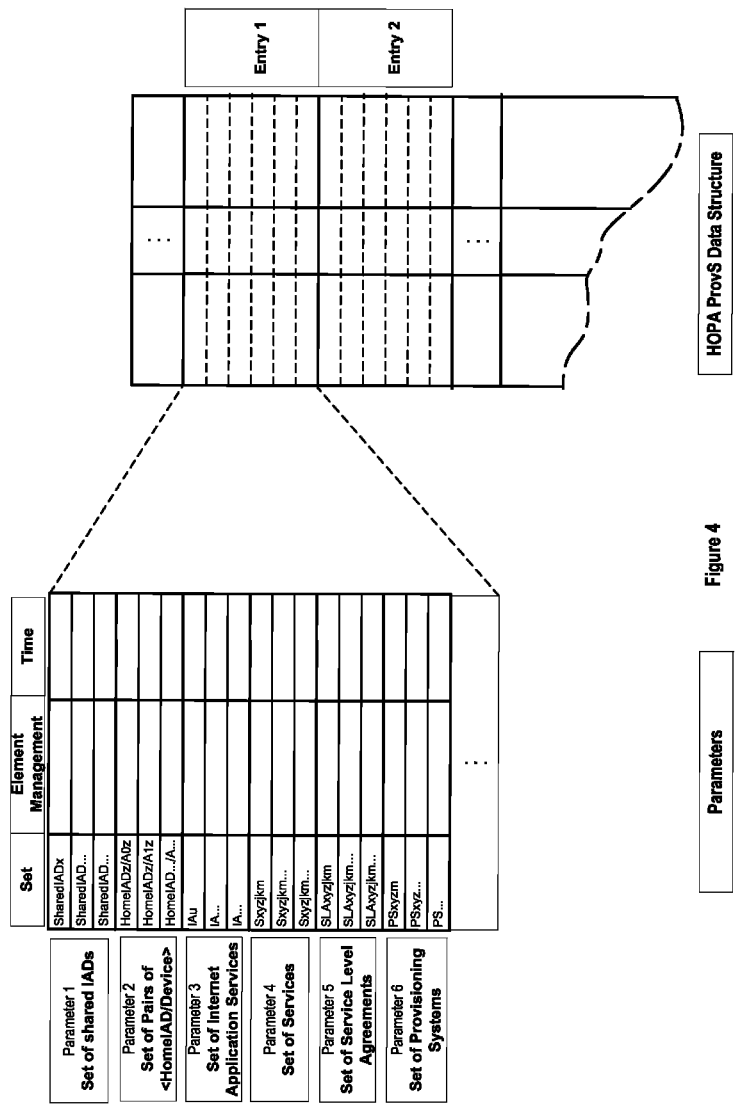

HANDOVER PROACTIVE ASSOCIATION PROVISIONING SUPPORT METHOD AND SYSTEM

BACKGROUND AND SUMMARY OF THE INVENTION

A. The Problem Solved by the HOPA-ProvS Method/Apparatus

The "HO Proactive Association Provisioning Support, HOPA-ProvS" method/system supports, for whatsoever handover (HO) technique underlying it, minimizing the HO times of netsurfing smartphones Ayz controlled by homeIADz (see EP 2027747, "HOBIS", incorporated by reference herein in its entirety) to sharedIADx and optimizing earnings from these sharedIADx—both by pre-HO provisioning alias establishing Sxyzjkm-associations for free up to the sharedIADx (plural "s" omitted). I.e., the sharedIADx services Sxyzjkm are provisionable to Ayz basically right at their HOs. A Sxyzjkm is made-up from the service of at least one Internet-app with a particular network service quality—as given by service level agreements SLAxyzjkm between an Ayz's user resp. its homeIADz's management and the management of the sharedIADx—potentially restricted by given HOPA provisioning systems PSxyzjkm designed such as to optimize e.g. their common earnings from the sharedIADx, x, y, z, j, k, m=0, 1, 2, . . . .

This enables a second innovation of the HOPA-ProvS method/system: For any shared-IADx a pre-(and/or post-) HO automatic auction of its service capacity—if Ayz demand from it services exceeding its capacity—controlled by e.g. a PSxyzjkm and/or a HOPA clearing system (see "HOPA-ClearS", U.S. 61/451,971).

A third HOPA-ProvS innovation is of quite different nature. It may make the sharedIADx automatically generate lucrative clicks on services of location based Internet-apps issued by Ayz passing through sharedIADx's reach. Examples are clicks on web sites 1.) which directly leverage on Ayz's actual location (e.g. its closest coffee shop), or 2.) which indirectly leverage on Ayz's actual location (e.g. an Ayz's user calls a public transport system or approaches some specific company), or 3.) which leverage also on Ayz's earlier locations (e.g. for tracking the way he took to his actual location).

A fourth HOPA-ProvS innovation is again of quite different nature: It greatly facilitates the indispensable everyday extremely competitive marketing needs of Internet-apps, as it enables running several such provisioning (and clearing) systems concurrently, even as to any sharedIADx—thus enabling high flexibility as to instant and local/regional system restructuring, e.g. on behalf of pricing strategy adaptations and/or version control.

The HOPA-ProvS method/system resolves by its pre-HO activities the problem to manage sharedIADx such that HO-times of a given set of Ayz to them are reduced to basically zero, and a variety of HOPA provisioning systems of services of Internet-apps may flexibly optimize earnings from the sharedIADx's providing these services, whereby it even facilitates locally/regionally targeted, instant, and seamless changes of system versions, e.g. as required for dynamic marketing activities.

That, as seen post-HO, most such pre-HO activities of the HOPA-ProvS method/system have been useless, is economically by far overcompensated by its just outlined advantages.

The application of the HOPA-ProvS method/system needs no change of the networks between which the above described pre-HO support of their HOs/MHOs shall be performed, i.e. it may work on top of all networks between which HOs or MHOs may be executed, though it may be integrated into networks and/or their HO mechanisms as well.

B. The Novelty and the Nonobviousness of the HOPA-ProvS Method/System

The novelty of the HOBIS invention has just been established by the HOBIS patent. As the HOPA-ProvS method/apparatus builds on top of the HOBIS invention, there is absolutely no prior art for it—so far no inventor has ever thought into this direction and disclosed a technique teaching enabling resolving the above quoted problem. This makes not only its novelty self-explanatory, but also its nonobviousness.

BRIEF DESCRIPTION OF THE DRAWINGS

FIG. 4 is a diagram illustrating a handover proactive provisioning and support data structure, in accordance with the present invention.

DETAILED DESCRIPTION OF THE INVENTION

C. Description of the HOPA-ProvS Method/System and its Embodiments

Due to the novelty of the netsurfing and MHO methods of the HOBIS patent—which are particularly important for the HOPA-ProvS method/system and for which it is particularly important—their fundamental features are outlined, first. This simplifies the subsequent description of the HOPA-ProvS method/system.

A remark up front: This HOPA-ProvS patent application comprises no limitation of the functionalities of pre-HO provisioning strategies of "Sxyzjkm-associations" (see Section D)—thus the HOPA-ProvS method/system is inherent in all HO proactive association provisioning strategies.

Let's start with a netsurfing system A0 with homeIAD0 and with an MHO of A0 to a sharedIADx, as known from the HOBIS patent. The HOPA-ProvS method/apparatus deals with non-managed HOs—and in particular with "service-HOs" (see Section D), managed or not—the same way as explained now by means of MHOs.

Each MHO of a netsurfing system A0 is supported by its homeIAD0 (see the HOBIS patent). Any OSI-connection of A0 is relayed via the MHO-module MHO-M, which is controlled by an MHO-specification MHO-S in the homeIAD0 or even executed there. The MHO-S may be homeIAD0-management-private, A0-type-specific or even A0-individual. The HOPA-ProvS-S/-M are peer to the MHO-S/-M, but functionally quite different.

Figure 1:
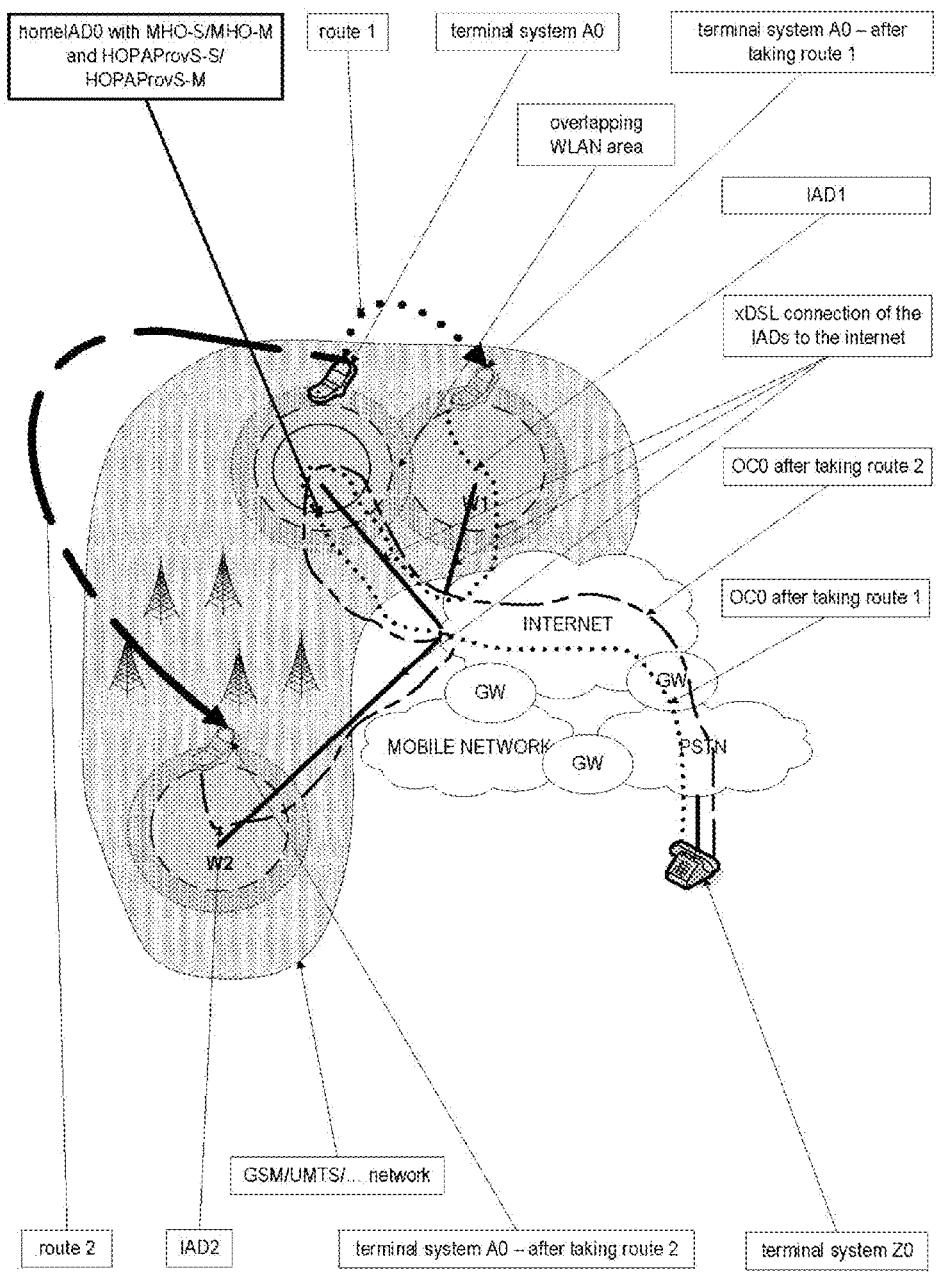
FIG. 1 is a block diagram of a netsurfing configuration applicable to the present invention.

FIG. 1 shows the simplest netsurfing configurations. MHO-S/-M and HOPA-ProvS-S/-M are assumed to be integrated into the homeIAD0 (FIGS. 6-8 in the HOBIS patent show their distributed implementations and hence there is no need to recapitulate this here). It illustrates an MHO of the netsurfing A0 (e.g. of a smartphone with a user and an existing OSI-connection, OC0, see chapter D.) from its homeWLAN0, for short: W0 (of the homeIAD0), into W1, which is non-disjoint to it, respectively into W2, which is disjoint to it, along route 1 or 2 respectively. The existing OC0 between A0 and Z0 is not touched by these MHOs along the routes 1 resp. 2. However, after A0 has completed its HO into W1 or W2, one L3-connection/association in this OC0 is relayed from the IAD1 resp. IAD2 (here: sharedIAD1 resp. sharedIAD2) over the A0-MHO-M in the homeIAD0. Technical details and variants (e.g. "tunneling"/"multiplexing"/"compressing") are known from mobile Internet technique.

As to a small and a large home/sharedIAD resp. its home/shared(W)LAN, the same holds as what is said in the HOBIS patent: Its LAN/WLAN is considered as Internet access LAN/WLAN (alias IAW), and may comprise, for this invention, one or more cells and hence IADs of any wireless technology, e.g. of RFI/WiFi/Blue Tooth/Femtocell/DECT/Wimax/GSM/CDMA/UMTS/GPRS/HSPDA/LTE/ . . . technologies. But, this IAW must be managed (by some "overlay network functionality") such that it functionally is a single endsystem representing a single home/sharedIAD, as managed in this invention. Then seamlessly roaming between its cells is possible, in particular without interruption of any of its existing OSI-connections, OCs. Thus, an IAW may be distributed regionally and e.g. comprise IADs and/or such BS's (BS=Base Station of a mobile network) connected via fixed-line PSNs (=Packet Switching Networks), extend only to parts of their regions of technical accessibility, and geographically comprise separate areas even with holes therein. The HOPA-ProvS method/apparatus is applicable for HOs between all such "network configurations", i.e. between IAW cells as well as between IAWs.

As stated above, the HOPA-ProvS method/system achieves its innovations by acting at points in time, namely pre-HO, which is neither considered by the prior art in HO technology nor by the HOBIS patent. These pre-HO operations of the HOPA-ProvS method/system determine—for a set of sharedIADx, a set of netsurfing mobile terminal systems Ayz with homeIADz, a set of services Sxyzjkm being based on a set of service level agreements SLAxyzjkm and a set of HOPA provisioning systems PSxyzjkm, x, y, z, j, k, m=0, 1, 2, 3, . . . —the set of all limitations for provisioning Sxyzjkm-associations, which are or may be requested by the Ayz. As the service Sxyzjkm shall instantly be available to Ayz right at its HOing to the sharedIADx, these pre-HO operations of the HOPA-ProvS method/system proactively establish already all netsurfing x/yz-associations (of which only one needs to be needed) completely and all x/u-associations at least basically (see the second bullet point of the next paragraph and Section D), which potentially are required for providing Sxyzjkm to the user of Ayz. I.e., the "netsurfing" services in this Sxyzjkm-association are pre-HO established completely and the "non-netsurfing" services therein (of which none at all needs to exist) at least basically.

Of the preceding paragraph, its
first sentence shows that and how the HOPA-ProvS method/system provides a framework for any optimization of the expected revenues from this set of sharedIADx: It namely identifies and describes limits for all the current contractual relations which may be used for revenues optimizations, i.e. shows for any pair <sharedIADx/Ayz> its service offering/need and its momentary potential contribution to revenue optimization based on its SLAxyzjkmu. In addition, this HOPA-ProvS information—the person of pertinent skill knows that it would be stored in a "HOPA-ProvS data structure" providing a basis for any optimization of revenues achievable by marketing the Sxyzjkmu via sharedIADx—provides also a basis for any optimization of customer support for the Ayz users, individually or collaterally or globally (see HOPA-ClearS).

second sentence shows that and how the HOPA-ProvS method/system actually may marginalize HO-times encountered by the Ayz user (and would be caused if the Ayz had to reconnect, after the HO, to the service(s) of Sxyzjkm used prior to the HO, unless the pre- and post-HO networks cooperated in handing it over between them, what is not assumed in this patent application and thus implies that a Sxyzjkm-association must be established after the HO, again), why the HOPA-ProvS method/system establishes it proactively pre-HO. Thereby the HOBIS method/system guarantees that the x/yz-association(s) are established completely, while it may be impossible to instantly complete the establishment of an x/u-association (which need not exist, at all), e.g. pre-HO—due to the design or implementation of a communications application underlying it. This then is called a "basic establishment" of the communications connection, and the implied resp. HO-time then is reduced to "basically zero".

The practical implementation of the HOPA-ProvS system—wherein the implementation of the HOPA-ProvS-S controls the implementation of the HOPA-ProvS-M—always consists of physical HW and SW components, just like all working computers. Therefore, these HW components need not be used exclusively by its HOPA-ProvS-SW components, but may be used also by any other system's SW components. Thereby the implementation of the HOPA-ProvS data structure and its managing system(s) may be distributed, e.g. onto the respective homeIADz or sharedIADx, or centralized on some server, or a mixture of both. In addition, system design knows techniques enabling efficient and integrity preserving concurrent accesses to this data structure for updating/changing it flexibly and instantly by appropriately synchronizing all read and write accesses to it. Thus, the person of pertinent ordinary skill knows a plurality of embodiments of the HOPA-ProvS method/system The HOPA-ProvS method/system (for a netsurfing Ayz, its homeIADz and a sharedIADx) is subject to the fundamental restriction that Ayz may use the sharedIADx solely as a router solely to the Ayz-homeIADz resp. its Ayz-MHO_S with a fixed IP address—except for the services of communications applications privately provided by the sharedIADx. Both, the correctness of the IP address as well as the compatibility of such private services with the implementation of the HOPA-ProvS (and HOBIS) method/system, need to be explicitly approved by the managements of the sharedIADx prior to completing the HO of Ayz to it resp. of the Ayz-homeIADz or the Ayz. I.e., Ayz may use this sharedIADx also for using other services than those provided via the netsurfing x/yz-association, namely provided privately by the sharedIADx and bypassing the Ayz-homeIADz. The sharedIADx thus guarantees in real-time that its management can always identify, as to communications relayed over it and even prior to starting its application system, the managements of an Ayz and a PSxyzjkm being responsible for it (e.g. by their approvals).

Figure 2A:
FIGS. 2a and 2b are respective schematic and block diagrams of a business district having overlapping wireless network cells.
Figure 2B:
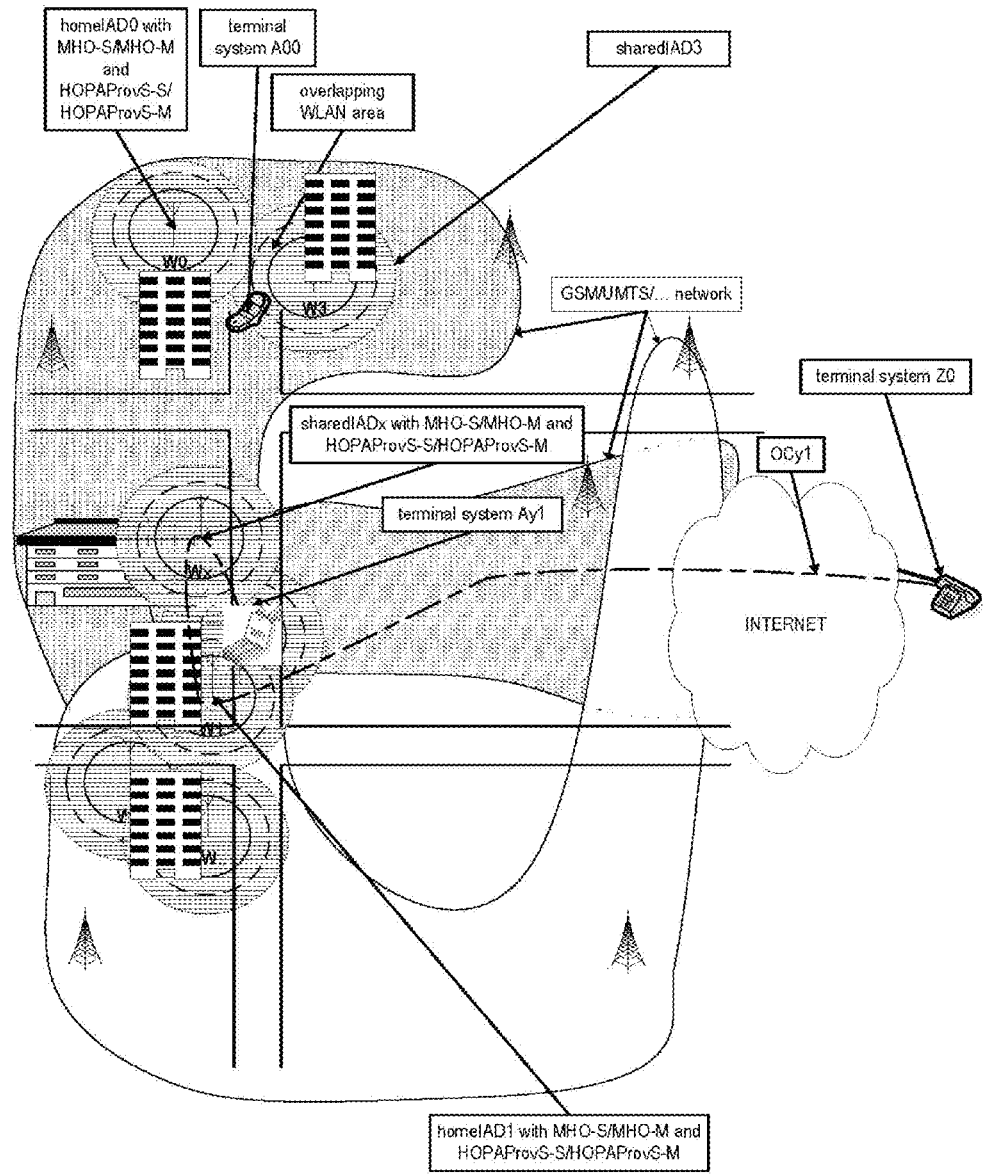

FIG. 2a schematically shows a business district, in any building of which there are several sharedIADx cells, overlapping and independent of each other (e.g. WiFi based, as zoomed-in by FIG. 2b), which on their turn overlap with several GSM networks—wherein the respective areas of accessibility of the sharedIADx'es are indicated by "dashed"

boundary lines. In addition, there insofar two different kinds of smartphone systems Ayz are schematically shown (visualized by their two different shapes), as they belong to two different homeIADz and its Ayz-MHO_S. If a mobile Ayz moves, e.g. along the street in FIG. 2a, then permanently new potential and/or actual HO requirements arise for Ayz as to a series of sharedIADx'es along its way. The appropriateness check of a potential HO as to its optimality by a HOPA clearing system (see the HOPA-ClearS method/system above) and its actual execution are accelerated by the HO-proactive HOPA-ProvS method/system.

Something can change in this context even without Ayz moving, stimulating the question whether its HO were appropriate—due e.g. to either an SLA unacceptable decrease of the quality/cost ratio of the L3-service provided to Ayz by its currently used sharedIADx, or to an increase of the L3-service quality needed by Ayz because of its user's start of another broadband streaming application, or to the HOPA provisioning system's cooperation with another system (e.g. a HOPA clearing system).

Figure 3A:
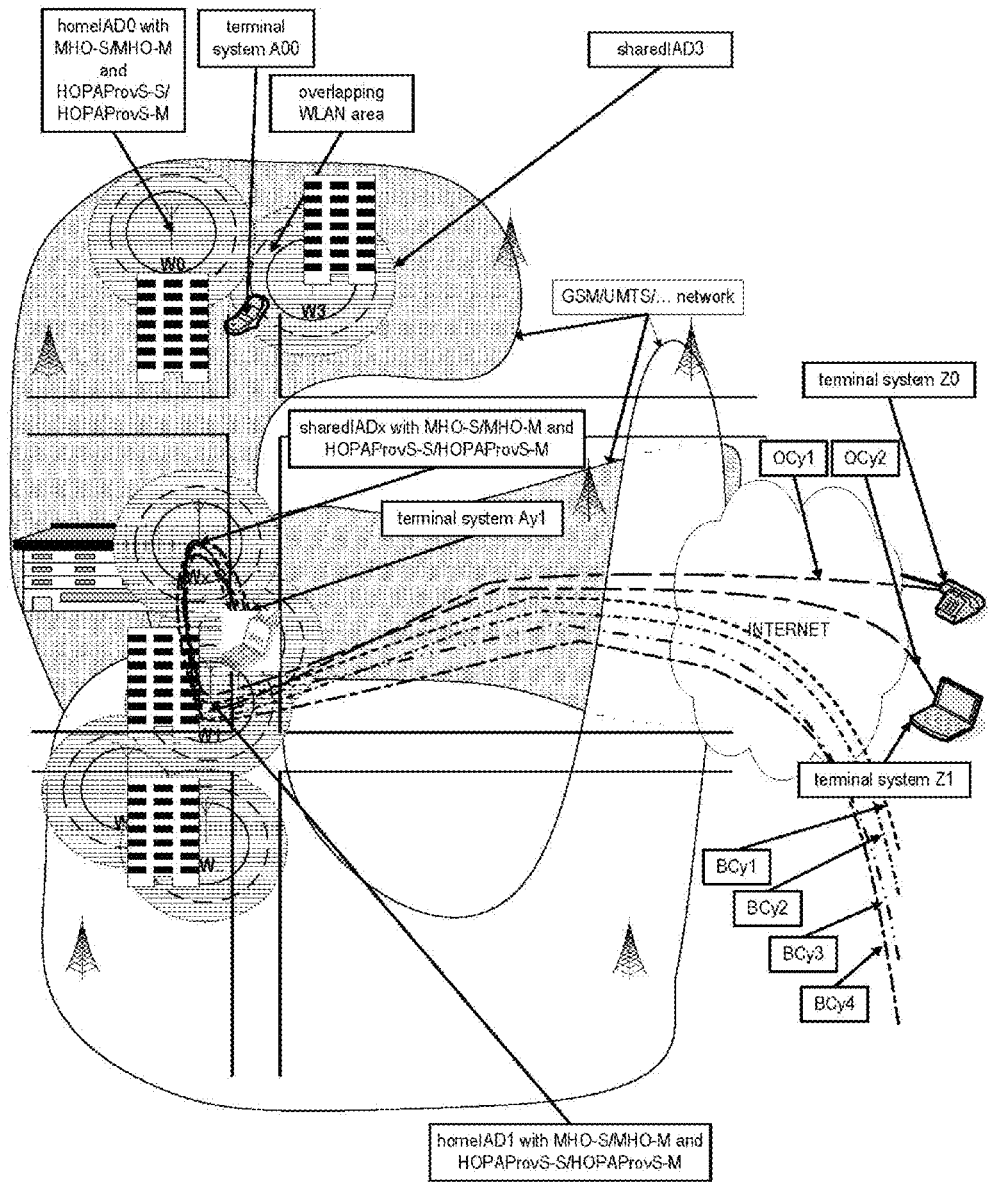
FIGS. 3a and 3b are block diagrams illustrating different particular handover situations for a subscriber, in accordance with the present invention.
Figure 3B:
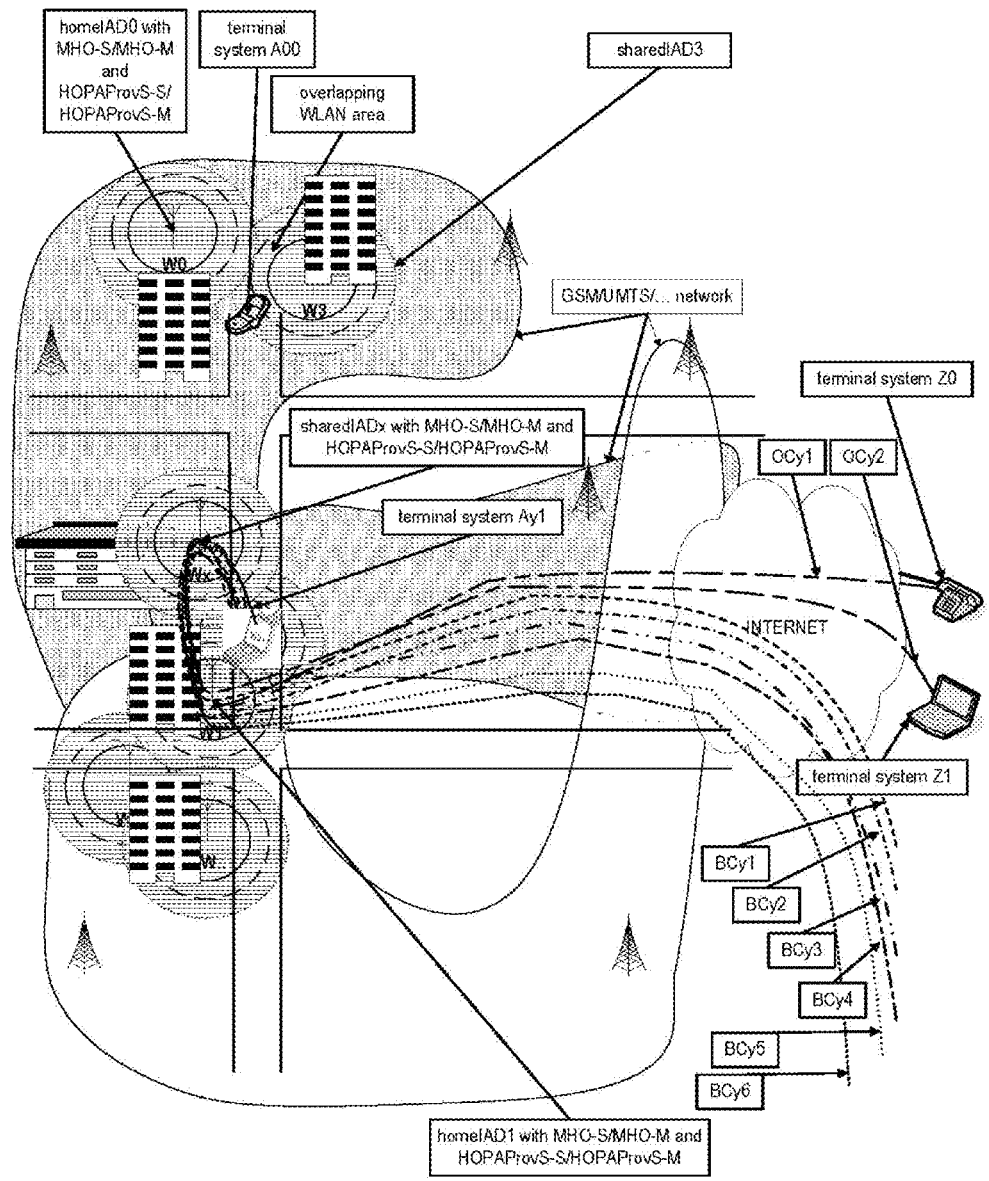

FIG. 3a shows for Ay1 its homeIAD1, its currently used sharedIADx, and its 2 OCy1, OCy2 and 4 BCy1-4. The HOPA-ProvS method/system may recognize pre-HO, which Sxyzjkmu-association proactively to establish resp. relay. FIG. 3b shows in addition that sharedIADx has the ability to also provide to Ay1 on his own BCy5 and BCy6, e.g. as demanded by Ay1's security and/or marketing and/or logistics and/or accounting and/or invoicing needs—being approved/supported by the HOPA-ProvS method/system. Enriching the FIG. 3 by an Ay2 kind of netsurfing systems is skipped here—but one single sharedIADx is able to route both kinds of Ay's at any point in time, i.e. is able to co-operate with several different HOPA provisioning systems.

FIG. 4 schematically shows a HOPA-ProvS data structure entry, as accessed from the side of the HOPA-ProvS modules on behalf of the managements of the homeIADz and their Ayz resp. of the sharedIADx and at least of one HOPA provisioning system, as well as from the side of e.g. the HOPA-ClearsS modules on behalf of the managements of the homeIADz and their Ayz resp. of the sharedIADx and at least of one (above mentioned) HOPA clearing system.

The Figures should finally recall that phone calls, IP-TV, video clips, security assessment, medical surveillance, navigation guidance, . . . need different kinds of L3-services and L3-L7 resources in the endsystems.

The HOPA-ProvS method/system may also support identifying/negotiating—concurrently to its above pre-HO determination of all currently possible Sxyzjkm-associations—all competitions of the Ayz as to the sharedIADx services and potentially disclose to them totally or partially (enabled by e.g. agreements between competitors), which competitions exist on what sharedIADx for what Sxyzjkm. Such agreements and/or decisions on negotiations may take place statically, e.g. upon buying or renting Ayz, globally or regionally or address dependent, with initial operation or anytime requested by its user, . . . and/or dynamically, e.g. dependent on the actual level of stress these devices are under (e.g. in a certain region), or on the degree of utilization of the Internet (e.g. in a region) or a Sxyzjkm, or . . . .

Some further hints as to the limitations of the HOPA-ProvS method/system seem appropriate:

There is no limitation as to the generation of and/or checking for and/or detection of a signal SIGxyz. In particular, it may be generated by a HOPA-ClearS system, as mentioned above.

Any Internet application service Sxyzjkm may be provided by a set of alternative and/or cooperating and/or concurrent or sequential communication applications and may involve several Internet endsystems.

A parameter may be constant or variable over time (predictable or not) and/or the same for several Ayz or sharedIADx or homeIADz and/or (in)dependent of another one, which holds in at least one geographic region and/or in at least one period of time.

There is no limitation as to additional pre-HO preparatory activities for an HO, e.g. communications with a HOPA-ClearS system mentioned above and/or additional given systems.

A HOPA-ProvS method/system may be capable of generating given alarms on the occurrence of certain events, such as on attempts to route data outside of the approved routings.

An auction of the HOPA-ProvS method/system may be fully automatic or interact with at least one user and/or may take place under its own control, or the control of the HOPA provisioning system, or some separate system.

Finally it is clear to the person of pertinent skill that the communication architecture of the HOPA-ProvS method/system discussed above, with a HOPA-ProvS-S module in an endsystem's homeIAD, is independent of whether the latter includes in addition an MHO-S and/or a HOPA-ClearS-S module—i.e. that the HOPA-ProvS method/system may be used also to support "non-managed" and/or "non-cleared" HOs; and this holds for "vertical" just as for "horizontal" HOs (see the HOBIS patent), and any mixture of all HO types mentioned above.

the HOPA-ProvS method/system can be integrated in an arbitrary XYZ functionality, which differs from the former's precedingly disclosed functionality in any thinkable manner, i.e. not at all exhibit the usage of the HOPA-ProvS method/system in a separated way. Nevertheless it holds in that case: As soon as this XYZ functionality includes the above disclosed functionality of a HOPA-ProvS method/system, it interferes with the scope of patent protection for the HOPA-ProvS method/system—provided it will be granted.

what is said in the preceding paragraph as to the HOPA-ProvS method/system holds equally for any system of any of its parameters.

D. Terms and Notions of the HOPA-ProvS Method/Apparatus

The telecommunications technical terms used by this patent application and their meanings are defined by resp. based on—as far as they became existent only recently, i.e. didn't exist then—the international standard "ISO 7498-1, Information Technology—Open Systems Interconnection—Basic Reference Model: The basic model", called "ISO/OSI-Reference Model". For the person skilled in the art it is the absolutely mandatory basis also for the interpretation of, i.e. meanings allocation to, all communications technological terms, which have arisen only after the adoption of this OSI Reference Model by all relevant international and national consensus forming bodies, worldwide, such as ISO, IEEE, ITU, ANSI, ETSI, DIN, BSI, AFNOR, . . . . This holds also for the communications technology based terms introduced here for enabling describing the innovations of this patent application.

As to this "OSI-RM" there is, i.e. exists, an "OSI connection" for any interacting communications application, i.e. for every communication between the two endsystems (e.g. A0 and Z0) hosting the resp. interacting communications application system causing it. Thus, the "existence" of an OSI connection for the interacting communications application (system) starts with the very beginning of its first interaction. This OSI connection then exists in particular between the two endsystems hosting the interacting communications application.

Here an OSI connection is often referred to by the acronyms OCj (=OSI connectionj) or BCj (="Business connectionj"), which are synonyms. The only reason for having the BCj is that it sometimes helps recalling that a communications application, Sj, may be a specific business application—then here also called "business communicationj", j=0, 1, 2, 3, . . . . Similarly, an OSI connection is often denoted as "communications connection".

The above said about OSI connections needs the following notional refinement. The OSI-RM defines the meaning of any "connection"—i.e. not only of a whole OSI connection, but also of any of its Li-connections (see below)—to be an "association" of its two endpoints. These endpoints are contained by an endsystem or a transitsystem. An example of an endsystem is a "netsurfing system, Ayz", and of a transitsystem is a "sharedIADx" being used by Ayz when roaming (for providing service Sj to its user). Thereby this sharedIADx is at the same time an endsystem of this roaming communications application system, partially contained by it. Each OSI connection comprises for each Layer.i, defined by the OSI-RM, at least one "Li-connection" alias "Li-association", $1 \leq i \leq 7$ (needing no provisioning to their end-/transitsystems, see below). Thus, any Li-connection "exists" with its Li-association—as both terms have the same meaning—as soon as one of its endpoint systems knows about the second one, i.e. knows the address of the other endpoint system.

Thus an OSI connection exists between endsystems A and Z, as soon as in one of A or Z this association has become known for an interaction between their communications application, e.g. as soon as in A the address of Z and a communications application is available for this interaction. I.e.: The availability of a communications application for achieving this interaction requires to first "provision" this communications application at least to A. I.o.w., at the time of an OSI association/connection coming into existence, its at least one communications application is already provisioned at least to the system starting this application's first interaction.

In any Li-connection of an existing/existent OC or BC the transfer of data between its both endpoints and hence endsystems—i.e. of this interaction via any of this OC's/BC's Li-connections—may start for/with performing its "establishment" alias "set-up", which achieves any necessary "establishment"/"set-up" of the resources needed for this Li-connection in A and Z and/or agreement between both endpoints about what technical parameters would be used in it. All of an OC's/BC's Li-connections/associations must have been set-up/established (at least temporarily), before the transmission of "user data"—between the parts in A and Z of the communications application system the OC/BC is serving—may be completed.

There are associations/connections, which are provisioned a priori, i.e. right from starting the systems (or their subsystems) supposed to contain a resp. endpoint of them. And there are associations/connections, which are established as soon as they become existent (both enabled by a priori agreements about such associations/connections). This always holds in particular for all L3-associations (="Network connections") over the Internet, i.e. for any L3-association of two Internet endsystems A and Z as soon as A deals with the IP-address of Z (for an interaction between them). I.e.: Having provisioned an association/connection does not imply its establishment.

For the HOPA-ProvS method/apparatus let the terms "x/yz-association", "netsurfing-x/yz-association", and "Sxyzjkm-association" denote a conglomerate of Li-associations between the sharedIADx and the Ayz resp. the sharedIADx and the homeIADz resp. the sharedIADx or Ayz and at least one other endsystem hosting part of a communications application—in all three cases (to be) used for providing a service Sxyzjkm to Ayz.

A netsurfing-x/yz-association always connects the sharedIADx with the homeIADz and a Sxyzjkm-association may be relayed partially or completely over the homeIADz. The "provisioning" of anyone of both kinds of HOPA-ProvS associations denotes, as defined above already, making the resp. communications applications available to these associations' endsystems. It is (to be) performed pre-HO in a way outsides of the scope of the HOPA-ProvS method/apparatus. HOPA-ProvS associations then come into existence as explained above, but would not yet be established in the general case.

The establishments of such existing HOPA-ProvS associations then also may be performed "basically pre-HO". I.e.: If the systems and network(s) executing an embodiment of the HOPA-ProvS provisioning system are fast enough, it is possible to establish completely pre-HO
  any netsurfing-x/yz-association (by having the sharedIADx and the Ayz run between them the resp. netsurfing protocol, see the above HOBIS patent), as well as
  any Sxyzjkm-association (up to the sharedIADx) by having the sharedIADx and the other endsystem(s) involved run between them the resp. communications applications protocols implemented such as to enable the endsystems to support a multitude of such associations' endpoints, as known by the person of pertinent skill. He also knows that some communications application systems would not tolerate such complete pre-establishments of connections to them—due to reasons irrelevant here—which implies that in these cases this connection establishment completion must be deferred until the HO is completed. Hence the attribute "basically" used in this context.

A "hand-over, HO" occurs with(in) an existent OSI-connection, if a modification occurs with at least one of its Li-connections' functional or nonfunctional characteristics. Accordingly: An "Ayz performs an HO to the sharedIADx", or briefly "Ayz HOes to sharedIADx", if such a modification occurs with at least one Li-connection of at least one of Ayz' existent OSI-connections. Thereby frequently an L3-association is modified in its quality and/or replaced by another one and/or added/removed to/from an OSI-connection. Note: This notion of HO comprises also "service HOs" occurring to Ayz as soon as a Sxyzjkm provided to it and/or its user by a sharedIADx is modified, be it a modification e.g. of one of its L3-connections and/or one of its L7-connections. This such modification may also occur only within the Ayz and/or may be supported by Ayz's communications with at least one given other system and/or network than that/those of the sharedIADx.

The invention claimed is:

1. A method for proactively provisioning at least one Internet application service to a user of a netsurfing system prior to a handover of said netsurfing system from one communication network access device to another communication network access device, comprising:

checking for a signal indicating that the netsurfing system may be handed over within a given time t1>0 to a communication network access device other than a communication network access device currently providing service to said netsurfing system;

in response to receiving said signal, establishing at the communication network access device to which said netsurfing system may be handed over, an association of the at least one Internet application service with said netsurfing system;

whereby said at least one Internet application service is available for use by said netsurfing system at a communication network access device to which it is handed over immediately upon completion of the handover operation.

2. The method of claim 1, wherein the communication network access device to which said netsurfing system is handed over, is a shared Integrated Access Device (IAD).

3. The method of claim 1, further comprising in response to receiving said signal, establishing between the communication network access device to which said netsurfing system may be handed over and the netsurfing system, an association of at least one Internet application service with said netsurfing system.

4. The method of claim 3, wherein the at least one Internet application service is defined by at least one service level agreement of a user of said netsurfing system.

5. The method of claim 1, further comprising initiating an auction or tariff negotiation activity with a user of a netsurfing system or the management of related home network access devices concerning services provided by a communication network access device to which a netsurfing system may be handed over.

6. The method of claim 5, wherein services provided by a communication network access device to which a netsurfing system may be handed over include marketing activity for an Internet application service or for a product or service not providable by that communication network access device.

7. The method of claim 2, wherein said IAD is a mobile or netsurfing system.

8. The method of claim 1, wherein the establishing of an association is performed in conjunction with a communication about at least one post-handover service quality.

9. The method of claim 1, wherein said signal is generated in dependence upon the location of the netsurfing system with respect to a communication network access device.

10. The method of claim 1, further comprising generating a further signal indicating a possible handover of said netsurfing system, upon completion of association establishment.

* * * * *